United States Patent
Nakajima et al.

(10) Patent No.: US 7,310,608 B2
(45) Date of Patent: Dec. 18, 2007

(54) AUTHENTICATION METHOD, AUTHENTICATION SYSTEM, PAYMENT SYSTEM, USER APPARATUS AND RECORDING MEDIUM CONTAINING PROGRAM FOR CONDUCTING AUTHENTICATION

(75) Inventors: Mitsuru Nakajima, Kawasaki (JP); Yoshiaki Imajima, Kawasaki (JP); Takayoshi Handa, Kawasaki (JP); Hitoshi Monma, Kawasaki (JP); Toshihiro Kodaka, Kawasaki (JP); Mikako Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 788 days.

(21) Appl. No.: 09/788,389

(22) Filed: Feb. 21, 2001

(65) Prior Publication Data
US 2002/0026414 A1    Feb. 28, 2002

(30) Foreign Application Priority Data
Aug. 25, 2000   (JP)   ............................... 2000-256340

(51) Int. Cl.
*G06Q 00/40*    (2006.01)
(52) U.S. Cl. ............................ 705/10; 705/44; 705/22; 705/78; 235/380; 385/255; 713/168
(58) Field of Classification Search ................ 705/62, 705/65, 71, 78, 68, 44, 22; 340/5.2; 713/170, 713/187, 168; 707/3, 10; 345/810, 835; 235/380, 492; 385/255
See application file for complete search history.

(56) References Cited

U.S. PATENT DOCUMENTS

| | | | |
|---|---|---|---|
| 4,912,762 A * | 3/1990 | Lee et al. ...................... 705/71 |
| 5,369,705 A | 11/1994 | Bird et al. | |
| 5,461,217 A * | 10/1995 | Claus .......................... 235/380 |
| 5,729,608 A | 3/1998 | Janson et al. | |
| 5,883,810 A | 3/1999 | Franklin et al. | |
| 5,890,136 A * | 3/1999 | Kipp ............................ 705/22 |
| 5,903,652 A * | 5/1999 | Mital ........................... 705/78 |
| 5,982,896 A * | 11/1999 | Cordery et al. ............... 705/62 |
| 6,000,832 A | 12/1999 | Franklin et al. | |
| 6,378,072 B1 * | 4/2002 | Collins et al. .............. 713/187 |
| 6,571,334 B1 * | 5/2003 | Feldbau et al. ............. 713/170 |

FOREIGN PATENT DOCUMENTS

| | | |
|---|---|---|
| EP | 1 028 401 A2 | 8/2000 |
| JP | 09-218905 | 8/1997 |

(Continued)

OTHER PUBLICATIONS

IBM, "VW/ESA OpenEdition DCE—Introduction and Implementation Noteboook", 1995 (selected pages, cover, i-viii, 1-17).*

(Continued)

*Primary Examiner*—Harish T. Dass
(74) *Attorney, Agent, or Firm*—Staas & Halsey LLP

(57) ABSTRACT

An authentication system, program and method authenticates users who are parties to a transaction by supplying a first user with a matching key for a prospective transaction, receiving by a second user the matching key supplied to the first user; and matching the key supplied from the first user to the second user against the key supplied to the first user, after the second user has received the key from the first user.

12 Claims, 12 Drawing Sheets

FOREIGN PATENT DOCUMENTS

| | | |
|---|---|---|
| JP | 10-078991 | 3/1998 |
| JP | 11-134303 | 5/1999 |
| WO | 00/02150 | 1/2000 |

OTHER PUBLICATIONS

Deng et al, 1997 "A New On-Line Cash Check Scheme" 1997, Institute of Science, National University of Singapore, Singapore (pp. 111-116).*

Kevin Henry, publish date not known "Getting Started With PGP" http://www.acm.org/crossroads/xrds6-5/pgptutorial.html (10 pages).*

Popek et al, "Encryption and Secure Computer Network", Dec. 4, 1979 (pp. 331-356).*

* cited by examiner

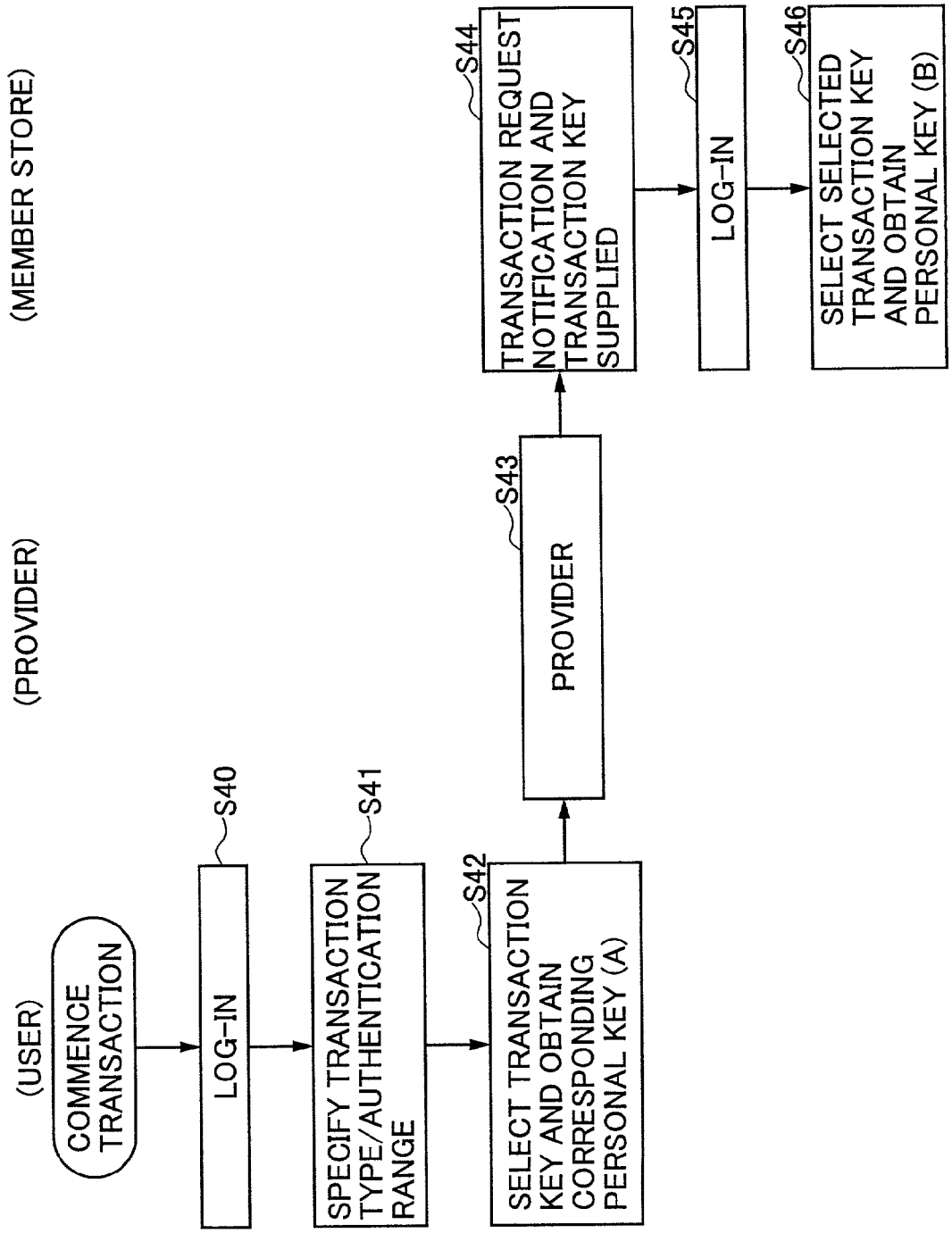

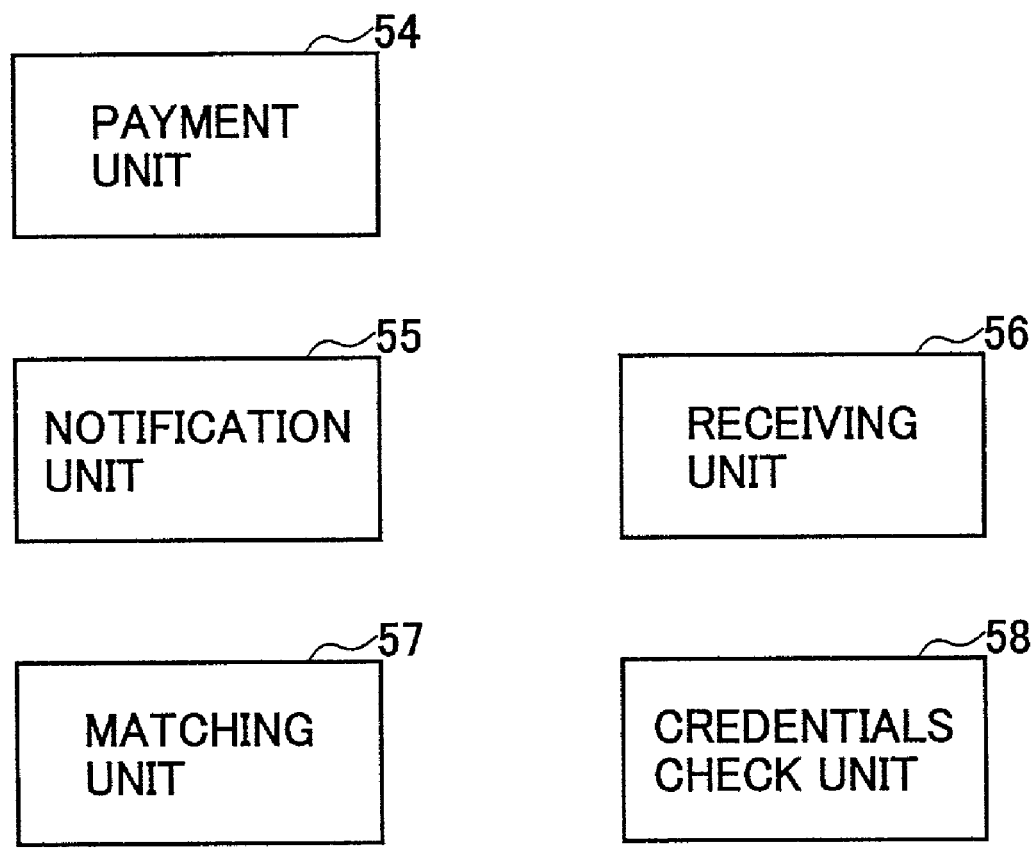

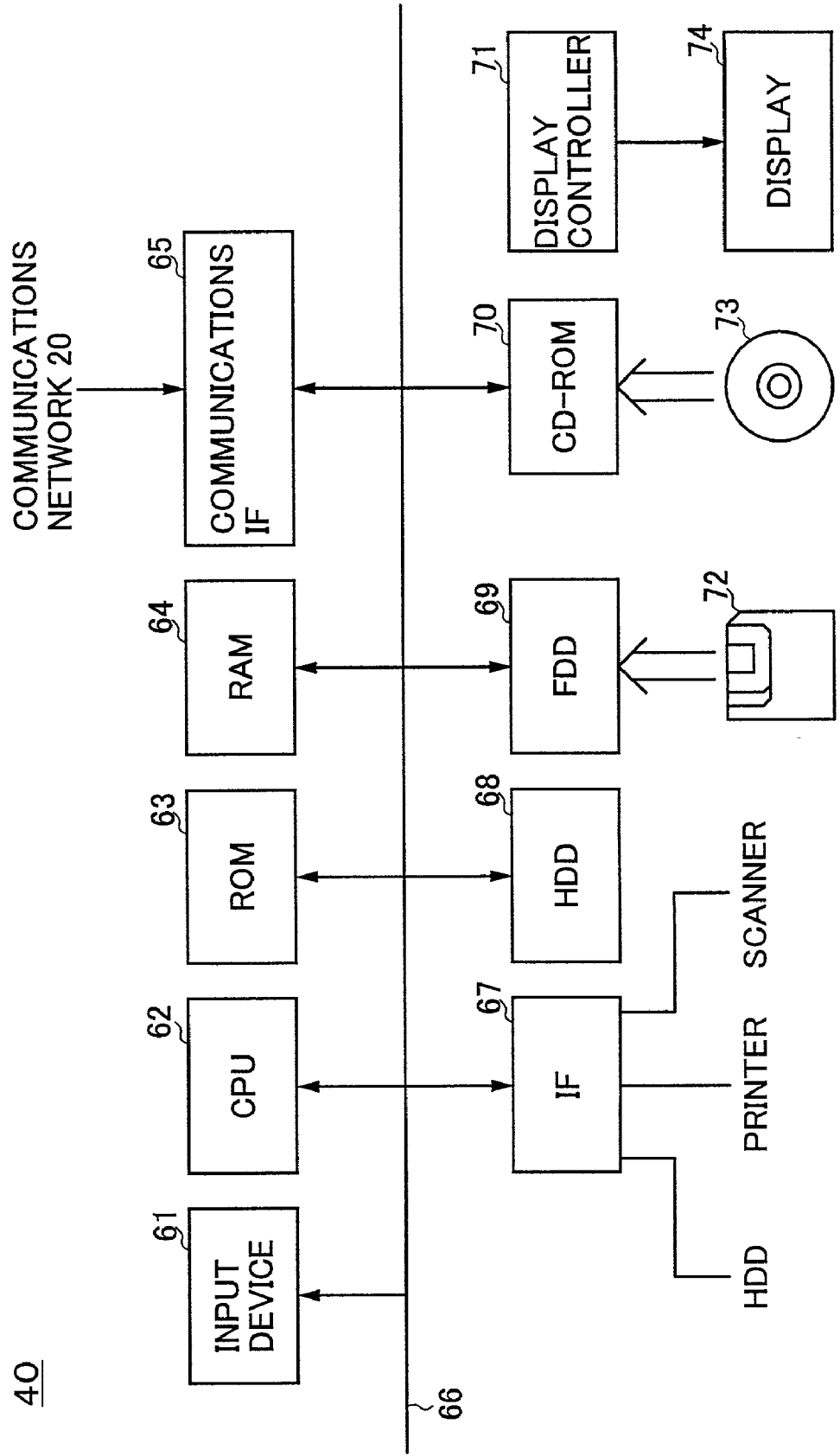

AUTHENTICATION METHOD, AUTHENTICATION SYSTEM, PAYMENT SYSTEM, USER APPARATUS AND RECORDING MEDIUM CONTAINING PROGRAM FOR CONDUCTING AUTHENTICATION

BACKGROUND OF THE INVENTION

1. Field of the Invention

The present invention relates to an authentication method, authentication system, payment system, user apparatus and recording medium containing a program for conducting authentication so as to facilitate a variety of commercial transactions.

2. Description of Related Art

In face-to-face transactions, if the purchaser has cash then the transaction will usually be settled in cash and, if not, then most often the purchase is consummated by credit card. Credit cards operate such that a signature alone enables the cardholder to make purchases up to within a certain limit from participating or member stores.

Credit cards are so handy (insofar as they eliminate the need to carry cash) that modern society is sometimes referred to as a cashless society or a credit-card society.

Moreover, with the recent rapid spread of the internet and other such communications networks it has now become possible to do on-line shopping over the internet. In this case, payment is by means of transmission of a member ID or password.

However, various security issues and disadvantages attend face-to-face transactions settled by credit card and the like, including authentication of participating member stores and card number skimming. Additionally, as far as the participating store is concerned, it is difficult to determine with certainty the true identity of the cardholder.

Additionally, in the case of online shopping and the like, there is the possibility that sensitive information, such as member ID numbers and passwords (which typically must be transmitted over the internet in order to complete the transaction) will be intercepted en route and put to unauthorized use, that is, used to make fraudulent purchases.

BRIEF SUMMARY OF THE INVENTION

Accordingly, it is an object of the present invention to provide an improved and useful authentication method, authentication system, payment system, user apparatus and recording medium containing a program for conducting authentication.

The above-described objects of the present invention are achieved by, in an authentication system for authenticating users who are parties to a transaction, an authentication method comprising the steps of:

(a) supplying a first user (a buyer) with a matching key for a prospective transaction;

(b) receiving at a second user (a seller) the matching key supplied to the first user; and (c) matching the key supplied from the first user to the second user against the key supplied to the first user after the second user has received the key from the first user.

According to this aspect of the invention, the use of temporary information to authenticate transactions between users A and B can provide a safe, convenient and highly reliable authentication system.

Other objects, features and advantages of the present invention will become more apparent from the following detailed description when read in conjunction with the accompanying drawings.

BRIEF DESCRIPTION OF THE DRAWINGS

FIG. 6 is a diagram illustrating steps in a process of commencing a transaction, beginning with before a customer goes to a restaurant;

FIG. 9 is a block diagram showing major functional blocks in an authentication and payments system;

FIG. 10 is a diagram illustrating a sample provider hardware configuration;

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

Figure 1:
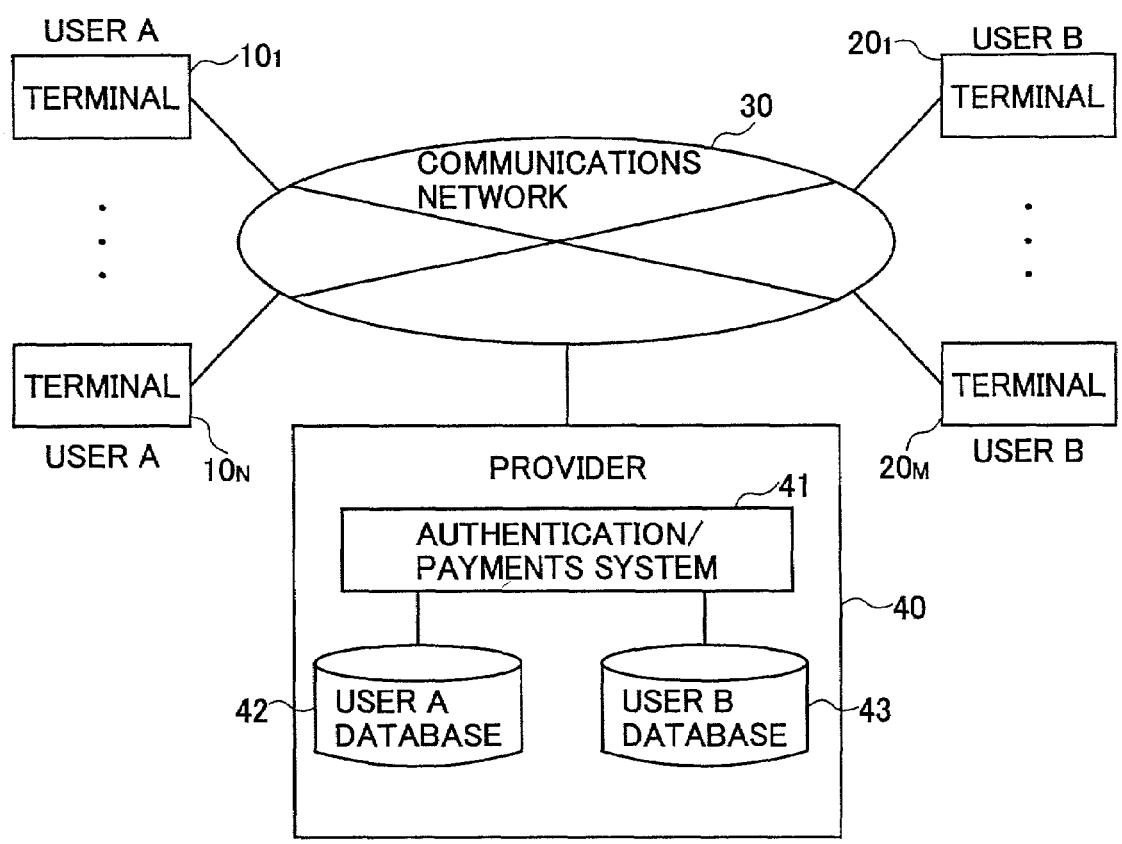
FIG. 1 is a diagram illustrating one configuration of an authentication and payments system according to the present invention.

FIG. 1 is a diagram illustrating one configuration of an authentication and payments system according to the present invention.

In FIG. 1, the system comprises user A (a first user, such as an individual) terminals $10_1$ through $10_N$, user B (a second user, such as a store) terminals $20_1$ through $20_M$, an internet communications network 30 and an application service provider 40. Additionally, the provider 40 has an authentication/payments system 41, a user A database 42 and a user B database 43.

The user A is a user of this system, that is, a person who is receiving a service or purchasing a product. User B is also a user of this system and conducts a transaction with user A, and is providing a service or selling a product.

The user A database 42 contains a user A ID number, password, payment or payment information and information concerning authorization to purchase merchandise. Similarly, the user B database 43 contains a user B ID number, password, payment or payment information and authorization to purchase merchandise.

As will be described later, the authentication and payments system 41 uses temporary information to authenticate transactions between users A and B so as to provide a safe, convenient and highly reliable payments system. Additionally, the authentication and payments system 41 also checks whether users A and B are authorized to use the system as well as whether users A and B are authorized to conduct the particular prospective transaction.

Additionally, the user A terminals $10_1$ through $10_N$ and user B terminals $20_1$ through $20_M$ need not be fixed terminals. By installing a browser and connecting to an application service provider 40 via the communications network 30, it is possible to view the web page provided by the provider 40.

Figure 2:
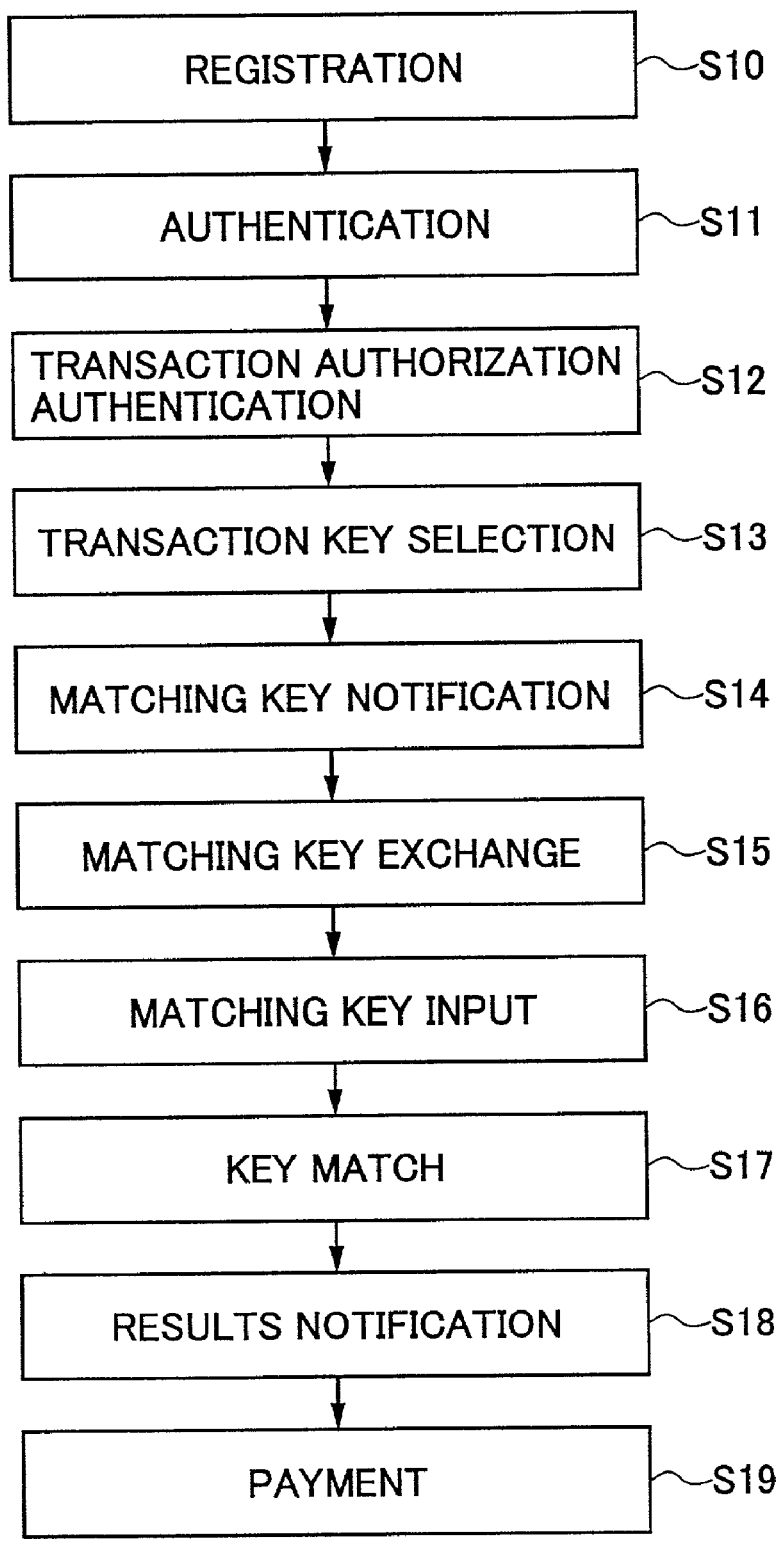
FIG. 2 is a flow chart showing steps in a sample mutual authentication and payments configuration.

FIG. 2 is a flow chart showing steps in a sample mutual authentication and payments configuration.

When, for example, a travelling salesman (user B) visits the home, the occupant of the home (user A) might wonder if the salesman is legitimate and the price reasonable, and, by the same token, the salesman might wonder if the person who answers the door has the ability to pay for the merchandise. Both sets of questions can be answered with the aid of a portable terminal.

In other words, by conducting authorization using the following steps, the merchandise can be handed over secure in the knowledge that neither party poses any problem for the other.

It is assumed that users A and B (hereinafter sometimes referred to as buyer and seller) of this system are subscribers to the application service provider 40, and that buyer and seller have each registered individually with the provider in a step S10.

Next, when seller calls on buyer at the latter's home, each has prepared in advance a portable terminal and the like. At this time, the buyer and the seller input their respective passwords A and B, with the provider providing authentication that the service can be accessed in a step S11.

Next, in a step S12, it is determined whether or not the buyer and the seller each respectively has the ability to enter into the transaction. For example, it is determined whether or not the buyer is authorized to purchase the merchandise and whether the seller is authorized to sell the merchandise.

The provider 40 checks the buyer (user A) database 42 and the seller (user B) database 43. Accordingly, a buyer found to be without the authorization to purchase the merchandise becomes unable to proceed with further transactions. Similarly, a seller found to be without the authorization to sell the merchandise becomes unable to proceed with further transactions. By so doing, it becomes possible to eliminate those buyers without the ability to pay and those sellers without the ability to sell, making it possible to transact business securely.

If both the buyer is found to have the ability to buy and seller is found to have the ability to sell, then transaction key selection takes place in a step S13.

Figure 3:
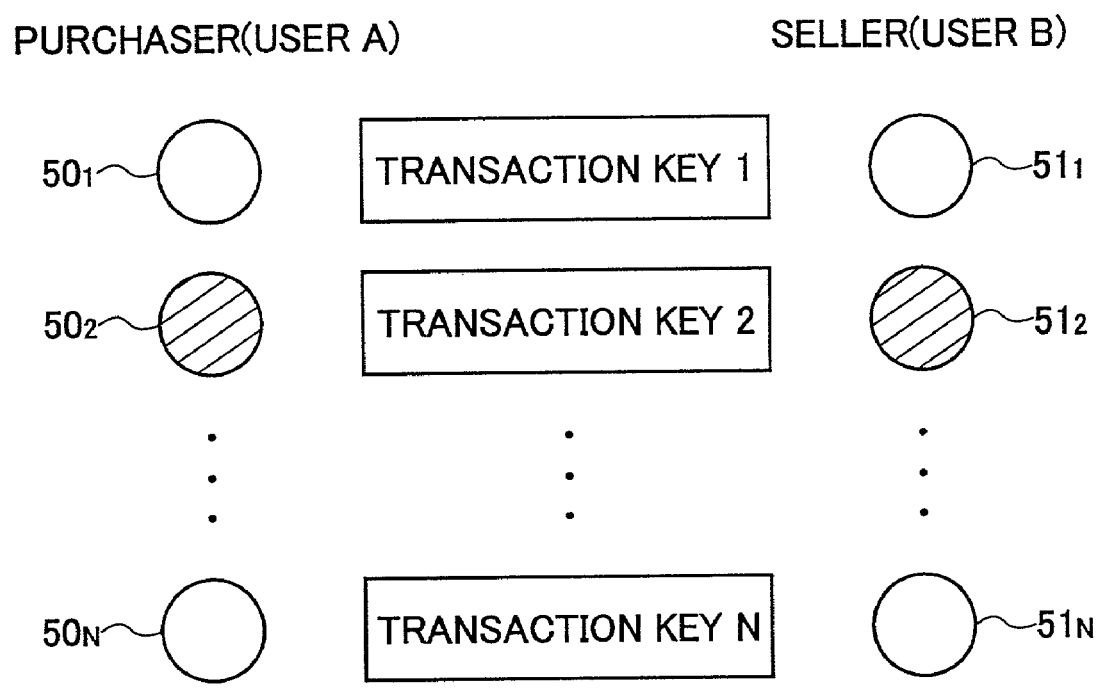
FIG. 3 is a diagram showing a sample transaction page screen.

FIG. 3 is a diagram showing a sample transaction page screen.

As shown in FIG. 3, the transaction page screen has transaction keys 1-N, as well as (buyer) user A buttons $50_1$ through $50_N$ and (seller) user B buttons $51_1$ through $51_N$ which correspond to those keys.

Users A and B view the same transaction page screen. The transaction page screen shows the transaction keys that can be used.

In a step S13, buyer and seller together decide which transaction keys to use, clicking the buttons as they go. For example, if transaction key 2 is to be used, then the buyer clicks button $50_2$ and the seller clicks button $51_2$.

When these buttons are pressed the users are each provided with separate keys that match (hereinafter matching keys, not to be confused with identical keys), such keys being displayed on the respective buyer and seller screens in a step S15.

Next, user A and user B each inform the other verbally of the matching keys provided from the provider 40.

Next, users A and B each input the matching key provided by the other at the common transaction number (here, the number that corresponds to transaction key 2) in a step S16.

In a step S17, the provider 40 determines whether or not the common transaction number and the two matching keys from the buyer and seller are the same keys provided by the provider 40 by matching the keys.

In a step S18 the provider 40 then supplies the results of the determination to the buyer and seller.

If the match is a good one, then it is clear that no problems exist with the parties and the merchandise changes hands, ending the transaction.

Next, the provider 40 uses the payment function to carry out payment in a step S19.

It should be noted that, if necessary, when each is notified of the other's matching key by the provider 40 the users A and B may be notified of the amount of money required for payment and determined.

Additionally, it should be noted that the seller B, though in the above-described case a person, may be a corporation.

The process of matching the keys (Steps S14-S18 in FIG. 2 above) will now be described using FIG. 4.

Figure 4:
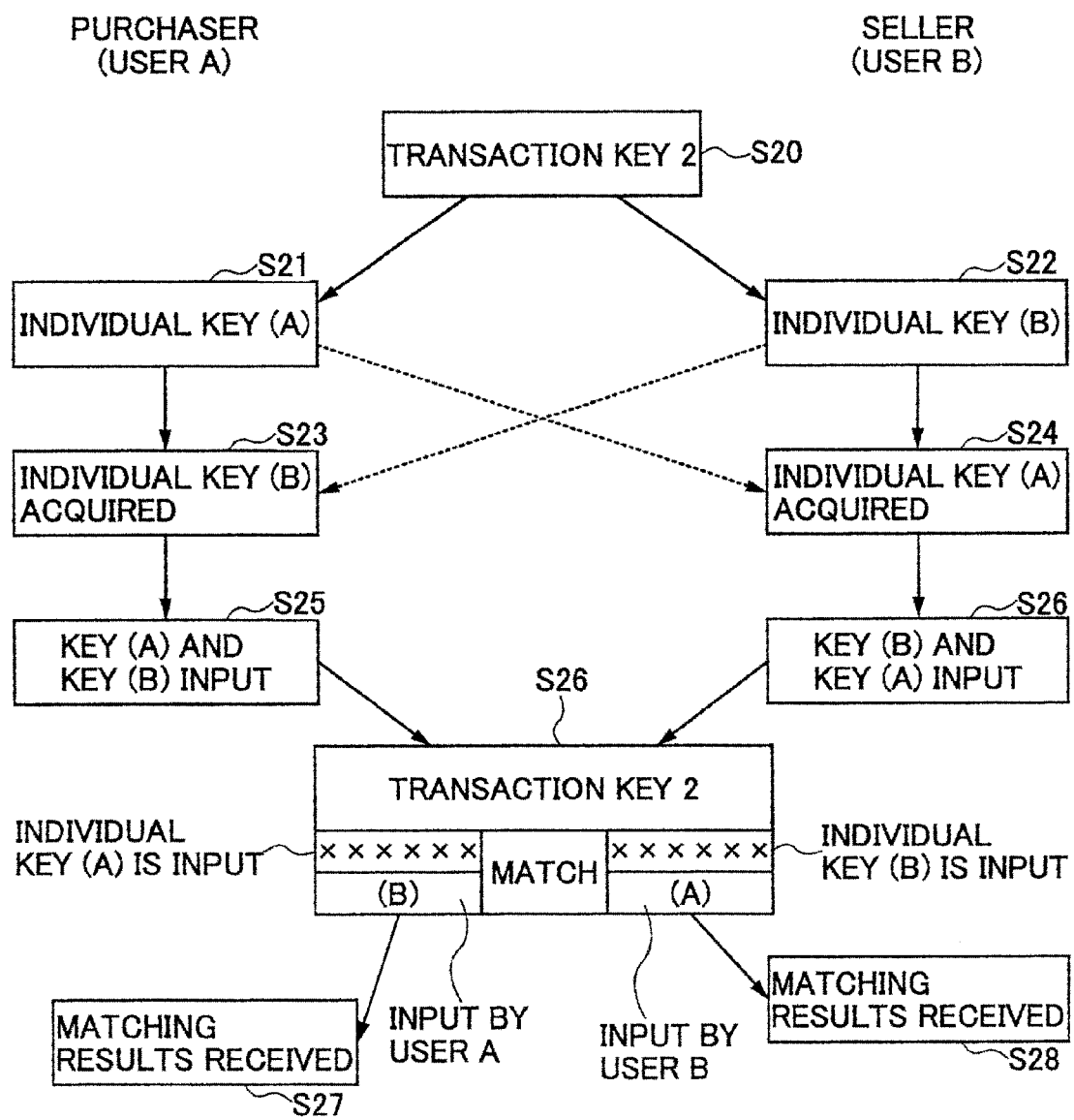
FIG. 4 is a diagram illustrating steps in a process of matching transactions.

FIG. 4 is a diagram illustrating steps in a process of matching transactions.

In FIG. 3 as described above, for the transaction key 2 the user A clicks button $50_2$ and user B clicks button $51_2$, which results in a personal key (matching key) A being supplied to user A and a personal key (matching key) B being supplied to user B in steps S21, and S22, respectively.

The personal key A and the personal key B are different keys, and both keys constitute information relevant to the transaction key 2. If the personal keys A and B match, then information relevant to transaction key 2 may be obtained.

The transaction key 2 is common to both users. However, personal key A is information known only to user A and, likewise, personal key B is known only to user B.

Users A and B exchange personal keys A and B in a step S23. In steps S25, S26, at a screen provided by the provider 40, the keys supplied by each of the users to the other concerning the transaction key 2 is input in steps S25, S26.

The individual key inputs, for example as shown in steps S25, S26 in FIG. 4, are input into screens A and B by the users to which the screens have been supplied, the screens being the same one supplied by the provider 40.

It should be noted that, as shown in the diagram, the personal key itself is not shown in a step S26.

The provider 40 then determines whether the user A personal key A and the personal key B obtained from the other party to the transaction match or not, and, in a step S27, the results of that determination are supplied to user A. Similarly, the provider also determines whether the user B personal key B and the personal key A obtained from the other party to the transaction match or not, and, in a step S28, the results of that determination are supplied to user B.

If there is a match, then it has been determined by the provider 40 that the persons actually present are authorized to conduct the transactions.

The present invention may also be conducted at a restaurant, with a description of an embodiment of the present invention given with reference to same and to FIGS. 5A, 5B, 6 and 7.

Figure 5A:
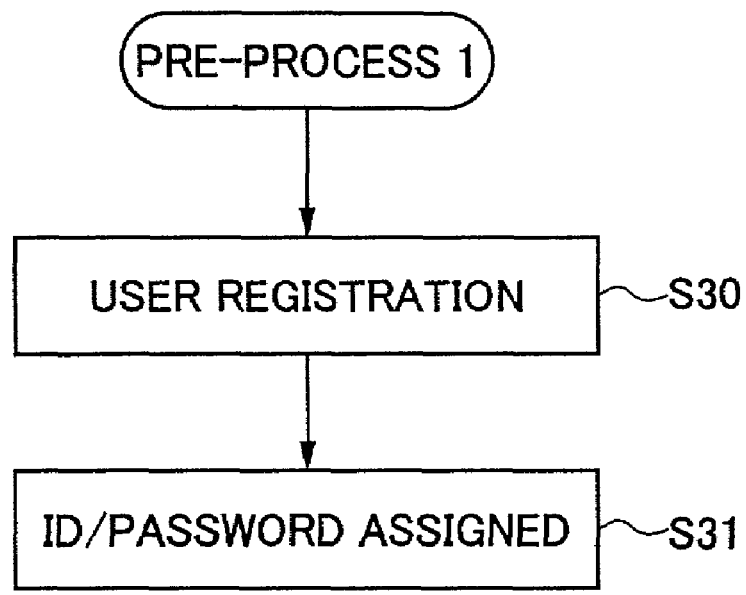
FIGS. 5A and 5B are flow charts illustrating steps in a sample pre-process process
Figure 5B:
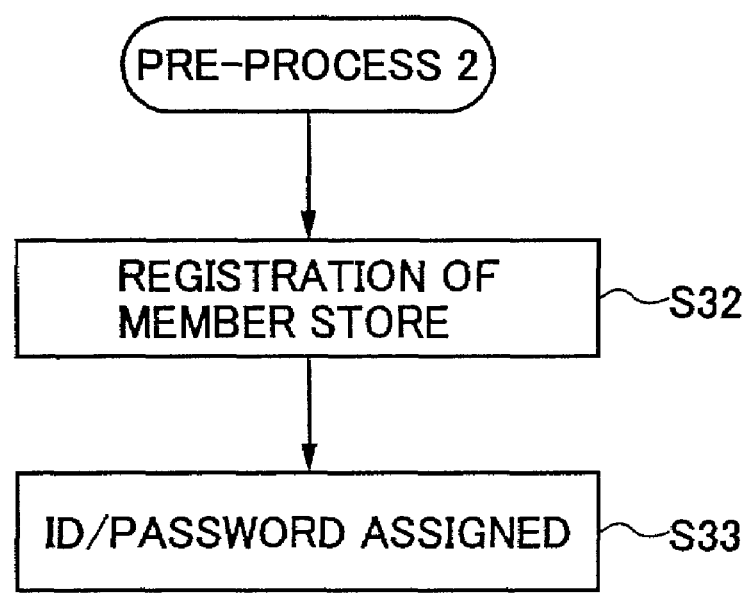

FIGS. 5A and 5B are flow charts illustrating steps in a sample pre-process process diagram showing a variation of the substrate depicted in FIG. 4. FIG. 6 is a diagram illustrating steps in a process of commencing a transaction, beginning with before a customer goes to a restaurant.

It is assumed that both the customer at the restaurant and the restaurant that use this system are both subscribers to the same application service provider and have registered individually.

In FIG. 5A, the restaurant user registers with a provider in a step S30, and receives a personal ID and password in a step S31.

In FIG. 5B, the restaurant registers with the provider in a step S32, and receives a personal ID and password in a step S33.

FIG. 6 is a diagram illustrating steps in a process of commencing a transaction, beginning with before a customer goes to a restaurant.

The restaurant customer connects to a provider using a terminal such as a personal computer or a portable terminal, inputs an ID/password and logs in (in a step S40). Next, the restaurant customer specifies a transaction type or an authentication range in a step S41. Specifically, the customer indicates he would like to receive a particular service or purchase an item from the restaurant in question.

At this time the restaurant customer, can, as necessary, specify conditions of the transaction (for example, whether a private room is required and so forth).

In a step S42, a transaction key is selected and a personal key A is obtained.

The customer then selects a transaction key and obtains a personal key A from the provider in a step S42.

Thereafter, in a step S43 that provider both informs the designated restaurant by electronic mail that there is a transaction request (in effect a reservation) and provides a transaction key.

At the restaurant, the reservation is received in a step S44. The restaurant connects to the provider, enters an ID/password and logs in in a step S45. Next, the supplied transaction key is either selected or input and a personal key B is obtained from the provider in a step S46.

Figure 7:
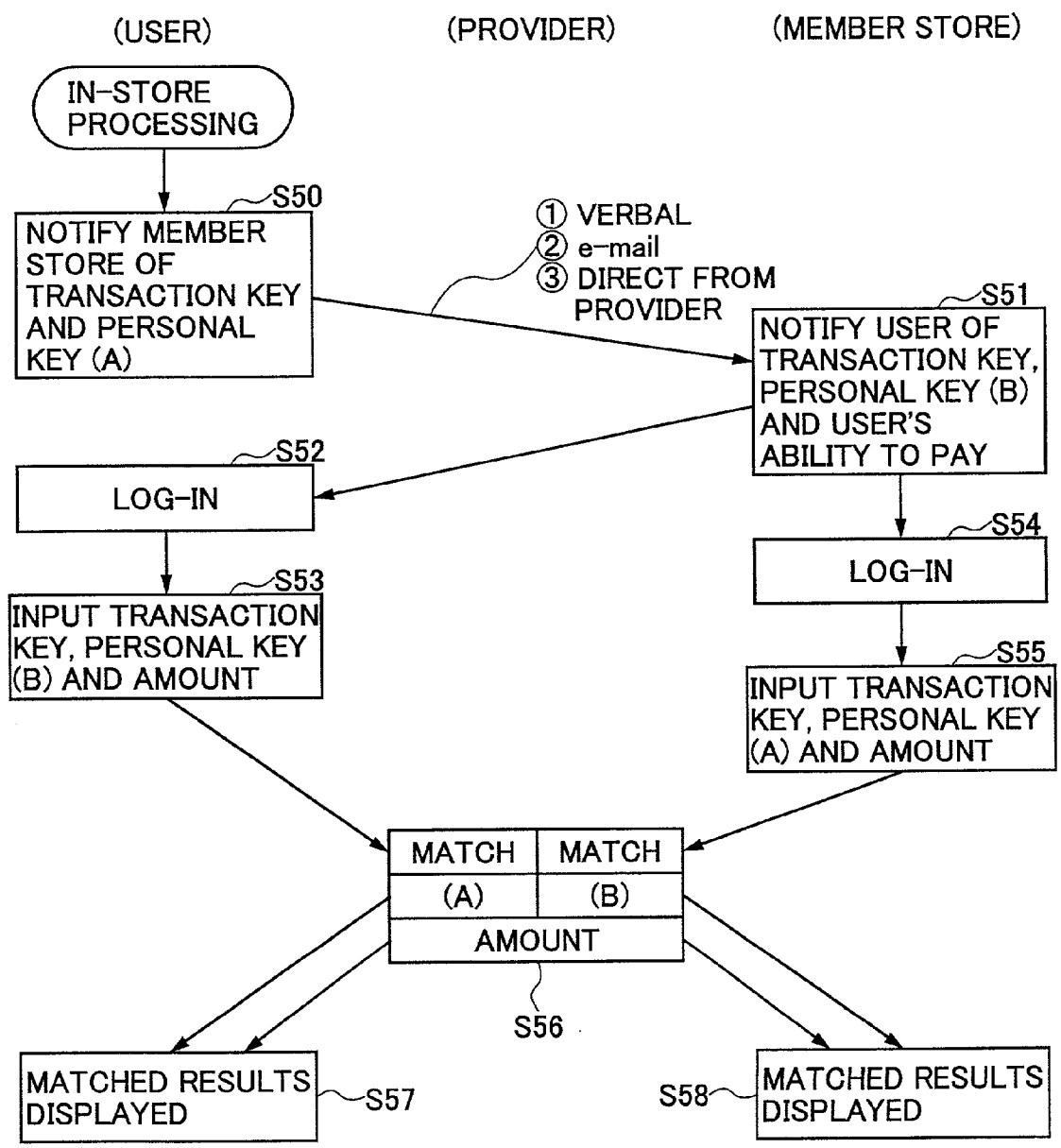
FIG. 7 is a diagram illustrating steps in a process of processing a transaction at a restaurant counter.

FIG. 7 is a diagram illustrating steps in a process of processing a transaction at a restaurant counter. The customer has now arrived.

The restaurant customer arrives at the counter and verbally informs the person at the counter of the transaction key and the personal key A in a step S50.

It should be noted that the supplying of the transaction key A and the personal key to the restaurant may be conducted by electronic mail, and may be done by the provider instead of the customer.

The restaurant counterperson then informs the customer verbally of the transaction key and the personal key B in a step S51.

Thereafter, the restaurant and the restaurant customer each connect separately to the provider, entering their respective Ids and passwords and logging in in steps S52 and S54.

The restaurant customer inputs the transaction key, personal key B and a monetary amount in a step S53 at a screen provided by the provider. Similarly, the restaurant also inputs the transaction key, personal key A and monetary amount in a step S55.

The provider then determines whether the separate transaction keys for the transaction key match, and, in a step S56, informs the restaurant and the restaurant customer of the results of that determination.

In steps S57 and S58, the match results are displayed at the respective terminals of the restaurant and the restaurant customer.

As a result, the restaurant customer making the reservation can receive service with the desired conditions.

It should be noted that it is not necessary to provide an amount column, nor is it necessary to supply an amount in order to carry out authentication.

As described above, the provider 40 determines whether the common transaction key on the one hand and the individual keys A and B on the other actually match. Such determinations are of two types, as shown in FIGS. 8A and 8B.

Figure 8A:
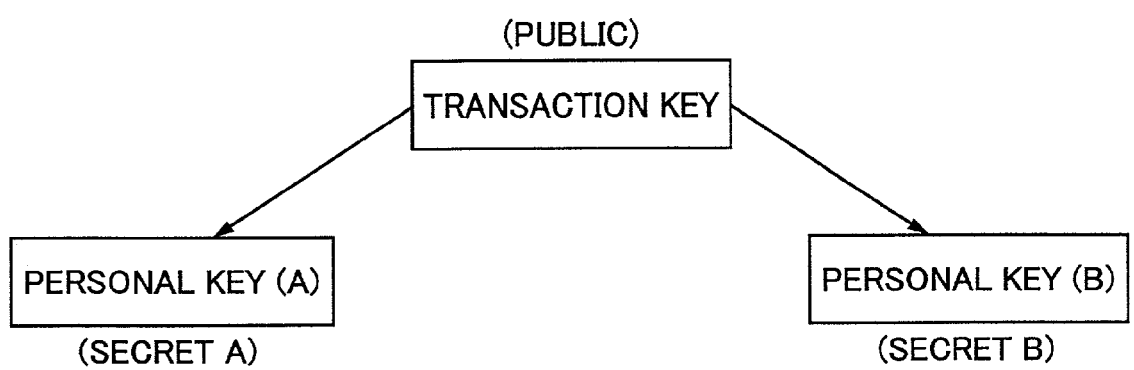
FIGS. 8A and 8B are schematic diagrams illustrating types of transaction matchings.
Figure 8B:
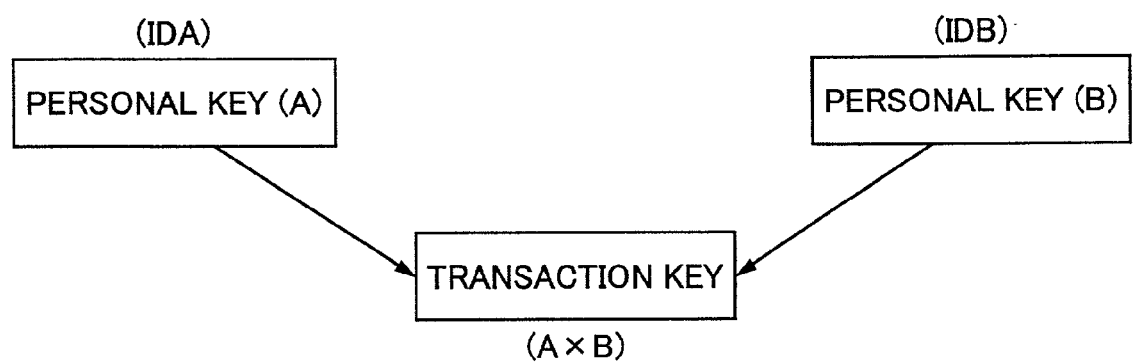

FIGS. 8A and 8B are schematic diagrams illustrating types of transaction matchings. One type is that shown in FIG. 8A, in which the provider provides personal keys A and B for a common transaction key. The process described above is an example of such a determination type.

By contrast, FIG. 8B shows an example in which personal keys A and B each provide unique information and which when combined form the common transaction key.

Such unique information can for example be the personal IDs used for authentication. However, as an alternative and an added security precaution, the personal ID itself used for verification can be replaced by, for example, a temporary personal ID used for log-in purposes only.

The common transaction key itself is used simply to identify the transaction, and need not necessarily be kept secret. However, in order to distinguish one particular transaction key from any other it is desirable to generate a specific transaction key.

For example, in order to form a common transaction key it is enough simply to run the two personal keys A and B together to form a unique third number. Or, as an alternative, such a unique number can be generated by performing some logical computation based on the personal keys A and B.

For example, if personal key A consists of the number 1234 and personal key B consists of the numbers 5678, then the common transaction can be as simple as 12345678. As an alternative, the two personal key numbers may be multiplied, producing a common transaction key consisting of the number 7006652. Another alternative common transaction key may be produced using a logarithm of the two personal keys A and B.

It will be appreciated that, with the determination process of the type depicted in FIG. 8B, it is not necessary to produce and provide a personal key.

The present invention can also be employed in hotel reservation systems as well.

For example, when making a reservation at a hotel that subscribes to this service, the customer can use an internet-supportable terminal (portable or otherwise) to make a reservation and obtain a personal key A (a reservation number). At the hotel at which the reservation is made the reservation of the customer is confirmed and a personal key B (a confirmation number) is provided to the customer making the reservation.

The customer making the reservation then inputs the confirmation number to complete a check of the hotel. At check-in, the hotel uses the reservation number from the customer to authenticate the customer and to confirm payment.

Additionally, the present invention may also be adapted for use in making reservations at an amusement park, movie theater or the like.

For example, in making a reservation at a participating amusement park or other such facility, the customer first acquires a reservation number, exchanges any necessary information, and can gain admittance to the facility by inputting the reservation number at an on-site computer.

FIG. 9 is a block diagram showing the major functional blocks in an authentication and payments system.

A payment unit 54 settles the transaction when an authentication and transaction have been conducted. A notification unit 55 supplies both users to the transaction with different keys, provides the users with information as to whether keys match, and in general supplies users with information regarding the transaction.

A receiving unit 56 receives the matching keys provided to each user and which the users exchange. After a second user has received the key from the first user, the matching unit 57 checks authenticates the key. Similarly, after the first user has received the key from the second user the matching unit 57 authenticates the key.

The credentials check unit 58 checks that the user s of the system are authorized to use the system and have the ability to enter into the transaction.

FIG. 10 is a diagram illustrating a sample provider hardware configuration 40.

As shown in FIG. 10, the hardware configuration 40 comprises an input device 61 consisting of a keyboard, pointing device and the like; a central processing unit (CPU) 62; a read-only memory (ROM) 63; a random access memory (RAM) 64; an interface (IF) 65 that interfaces with a communications network 20; an internal bus 66; an interface (IF) 65 that interfaces with a hard disk drive (HDD), printer and scanner; another HDD 68; a floppy disk drive (FDD) 69 that reads information from and writes information to a floppy disk (FD); a CD-ROM drive unit 70 that reads information from a CD-ROM; and a controller 71 that controls the display of a display unit 74.

The functions of the various pieces of hardware are commonly known, so a description thereof will be eliminated. As may be appreciated, the purpose of such a configuration is to conduct authentication, by using a recording medium on which a program for carrying out authentication according to the present invention is recorded so as to cause the CPU 62 to execute the program and conduct authentication.

It should be noted that the recording medium on which the program for conducting authentication according to the present invention is recorded can be any of a variety of computer-usable media, including magnetic disks such as floppy disks, hard disks, optical disks (CD-ROM, CD-R, CD-R/W, DVD-ROM, DVD-RAM, etc.), magneto-optical disks, and memory cards.

Figure 11:
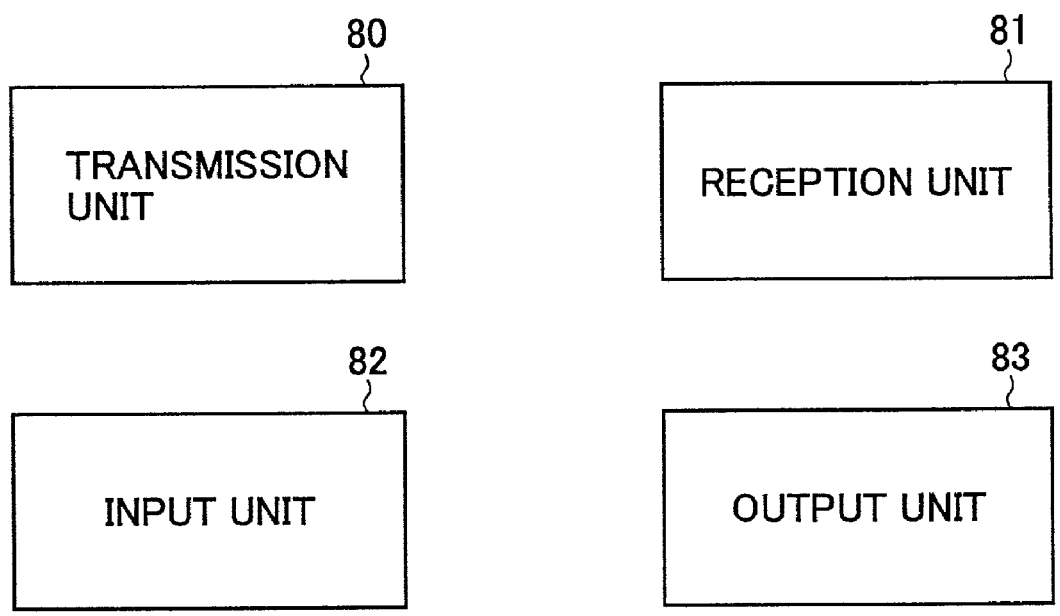
FIG. 11 is a diagram illustrating major functional blocks at user terminals.

FIG. 11 is a schematic diagram illustrating major functional blocks at user terminals A and B.

As shown in the diagram, the configuration comprises a transmission unit 80, a reception unit 81, an input unit 82 and an output unit 83.

The transmission unit 80 transmits information pertaining to the prospective transaction to a server, and further, transmits keys between users.

The receiving unit 81 receives the matching keys to the transaction from the server, and further receives the match results as well.

The input unit 82 is used to input items required for authentication and payment, such as IDs, passwords and matching keys.

The output unit 83 displays information sent to the user terminals concerning authentication and settlement.

It will be appreciated that, as described above, the embodiments of the present invention eliminate the need to carry credit cards or cash, an advantage insofar as cash and credit cards can be lost or stolen and, in the case of credit cards, the card numbers can be stolen and misused without stealing the cards themselves. Eliminating the need to carry either credit cards or cash eliminates these security concerns.

A description will now be given of a method of authenticating a transaction involving a reservations server that acts as an authenticating center and a pair of users, with reference to FIG. 12.

Figure 12:
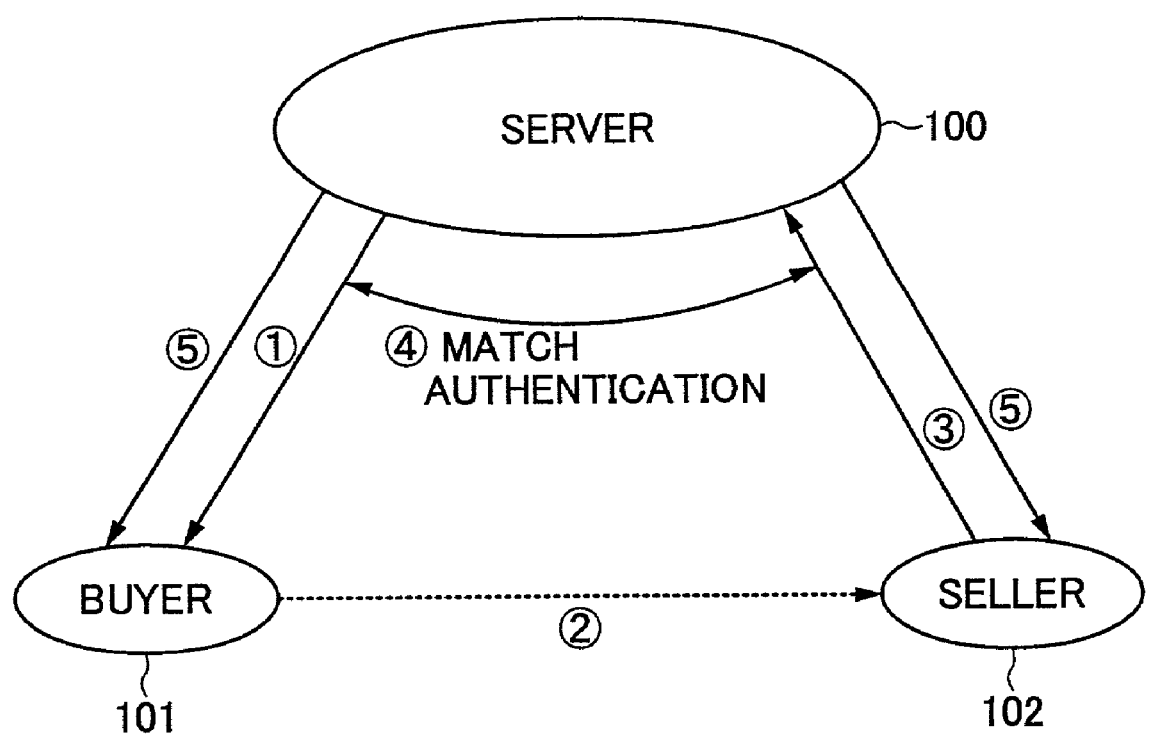
FIG. 12 is a schematic diagram illustrating an authentication method employing a server and two users.

FIG. 12 is a schematic diagram illustrating an authentication method employing a server and two users. As shown in FIG. 12, the method employs a server 100, a buyer (who could just as well be a seller) 101, and a buyer (who could just as well be a buyer) 102.

In step ①, the server issues to the buyer 101 a matching key for a prospective transaction in response to a request from the buyer 101. This matching key is a temporary one, and is supposed to remain unknown by third parties.

In a step ②, the buyer 101 informs the seller 102 of the matching key provided from the server.

In a step ③, the seller 102 supplies the matching key provided by the buyer 101 to the server 100.

In a step ④, the server 100 verifies that the matching key it provided to the buyer 101 is the same as the matching key provided by the seller 102 to the server 100.

In a step ⑤, if the results show that the keys match, then the buyer 101 and the seller 102 are so notified.

As described above, the server 100 can establish a relation between a buyer 101 and a user 102 who obtains the key from the buyer 101 based on the issuance of a temporary matching key, informing both users of the results.

Additionally, in the event that the buyer 101 and the seller 102 are required to register in order to use this system, the method described above provides authentication that the parties to the transaction are authorized users of the system, thus providing additional security.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-256340, filed on Aug. 25, 2000, the contents of which are hereby incorporated by reference.

What is claimed is:

1. An authentication method for authenticating users having respective terminal devices and users who are parties to a transaction, comprising:

checking, at an authentication system in response to accesses to the authentication system from terminal devices of the users, whether each of the users satisfies conditions for conducting a prospective transaction;

selecting identical transaction keys on screens of the terminal devices;

generating different matching keys based on the identical transaction keys;

transmitting the respective different matching keys from the authentication system to the terminal devices;

inputting, into a given one of the terminal devices, one of the matching keys that has been transmitted to and received by another one of the terminal devices;

transmitting said one of the matching keys from said given one of the terminal devices to the authentication system;

checking, at the authentication system, whether said one of the matching keys matches one of the transmitted matching keys; and notifying said one of the terminal devices a result of the checking of the matching keys.

2. The authentication method as claimed in claim 1, wherein the authentication system authenticates identities of the users prior to supplying a first user with the matching key.

3. The authentication method as claimed in claim 1, wherein the authentication system determines whether the prospective transaction is within a previously determined monetary limit.

4. The authentication method as claimed in claim 1, wherein the authentication system determines whether the prospective transaction satisfies previously determined conditions.

5. An authentication system for authenticating users who are parties to a transaction, comprising:
   a first unit checking, in response to an access to the authentication system from terminal devices of the users, whether each of the users satisfies conditions for conducting a prospective transaction;
   a second unit transmitting respective, different matching keys to the terminal devices after identical transaction keys are selected on screens of the terminal devices, said different matching keys being generated based on the identical transaction keys;
   a third unit receiving, from a given one of the terminal devices, one of the matching keys that has been transmitted to and received by another one of the terminal devices and then passed to said given one of the terminal devices; and
   a fourth unit checking whether said one of the matching keys matches one of the matching keys transmitted from the authentication system.

6. A user apparatus for authenticating one of users who are parties to a transaction via an authentication system, wherein the authentication system checks, in response to accesses to the authentication system from respective user apparatuses of the users, whether each of the users satisfies conditions for conducting a prospective transaction, said user apparatus comprising:
   a first unit transmitting a transaction key, selected on a screen of the user apparatus, to the authentication system, which responds by transmitting respective, different matching keys to the user apparatuses after identical transaction keys are selected on respective screens of the user apparatuses, said different matching keys being generated based on the identical transaction keys;
   a second unit receiving a first one of the matching keys;
   a third unit receiving an input indicative of a second one of the matching keys that has been transmitted to and received by another one of the terminal devices;
   a fourth unit transmitting said second one of the matching keys to the authentication system; and
   a fifth unit receiving a result of a check performed at the authentication system as to whether said second one of the matching keys matches one of the matching keys transmitted from the authentication system.

7. The authentication method as claimed in claim 1, further comprising providing payment of the transaction based on the matching results at the authentication system.

8. A computer-readable medium storing program code for causing a computer to authenticate users who are parties to a transaction, the program code comprising:
   a first unit transmitting a transaction key selected on a screen of the user apparatus to an authentication system, which responds by transmitting respective, different matching keys to user apparatuses after identical transaction keys are selected on screens of the user apparatuses, said different matching keys being generated based on the identical transaction keys;
   a second unit receiving a first one of the matching keys;
   a third unit receiving an input indicative of a second one of the matching keys that has been transmitted to and received by another one of the terminal devices;
   a fourth unit transmitting said second one of the matching keys to the authentication system; and
   a fifth unit receiving a result of a check performed at the authentication system as to whether said second one of the matching keys matches one of the matching keys transmitted from the authentication system.

9. An apparatus comprising a computer-readable medium storing program code readable by a computer for causing the computer to verify users who are parties to a transaction, the program code comprising:
   a first unit transmitting a transaction key, selected on a screen of user apparatus, to the authentication system which responds by transmitting respective, different matching keys to the user apparatuses after identical transaction keys are selected on screens of the user apparatuses, said different matching keys being generated based on the identical transaction keys;
   a second unit receiving a first one of the matching keys;
   a third unit receiving an input indicative of a second one of the matching keys that has been transmitted to and received by another one of the terminal devices;
   a fourth unit transmitting said second one of the matching keys to the authentication system; and
   a fifth unit receiving a result of a check performed at the authentication system as to whether said second one of the matching keys matches one of the matching keys transmitted from the authentication system.

10. A computer-implemented method for verifying users having respective user apparatuses and who are parties to a transaction, the method comprising:
    transmitting a transaction key, selected on a screen of a user apparatus, to an authentication system which responds by transmitting respective, different matching keys to the respective user apparatuses after identical transaction keys are selected on corresponding screens of the respective user apparatuses, said different matching keys being generated based on the identical transaction keys;
    receiving a first one of the matching keys;
    receiving an input indicative of a second one of the matching keys that has been transmitted to and received by another one of the terminal devices;
    transmitting said second one of the matching keys to the authentication system; and
    receiving a result of a check performed at the authentication system as to whether said second one of the matching keys matches one of the matching keys transmitted from the authentication system.

11. A computer specially configured by reading and executing program code, stored on a computer-readable medium, for causing the computer to verify users who have respective user apparatuses and who are parties to a transaction, the program code comprising:
    a first unit transmitting a transaction key, selected on a screen of a user apparatus, to the authentication system which responds by transmitting respective, different matching keys to the user apparatuses after identical transaction keys are selected on screens of the respective user apparatuses, said different matching keys being generated based on the identical transaction keys;

a second unit receiving a first one of the matching keys;

a third unit receiving an input indicative of a second one of the matching keys that has been transmitted to and received by another one of the terminal devices;

a fourth unit transmitting said second one of the matching keys to the authentication system; and a fifth unit receiving a result of a check performed at the authentication system as to whether said second one of the matching keys matches one of the matching keys transmitted from the authentication system.

12. A program stored in a storage and readable by a computer to control the computer to authenticate users having respective terminal devices and who are parties to a transaction, by:

checking an authentication system in response to an access to an authentication system from respective terminal devices of the users, whether each of the users satisfies conditions for conducting a prospective transaction;

selecting identical transaction keys on screens of the terminal devices;

generating different matching keys based on the identical transaction keys;

transmitting the respective different matching keys from the authentication system to the terminal devices;

inputting, into a given one of the terminal devices, one of the matching keys that has been transmitted to and received by another one of the terminal devices;

transmitting said one of the matching keys from said given one of the terminal devices to the authentication system;

checking, at the authentication system, whether said one of the matching keys matches one of the transmitted matching keys; and notifying said one of the terminal devices a result of the checking of the matching keys.

* * * * *

UNITED STATES PATENT AND TRADEMARK OFFICE
CERTIFICATE OF CORRECTION

| | |
|---|---|
| PATENT NO. | : 7,310,608 B2 |
| APPLICATION NO. | : 09/788389 |
| DATED | : December 18, 2007 |
| INVENTOR(S) | : Mitsuru Nakajima et al. |

It is certified that error appears in the above-identified patent and that said Letters Patent is hereby corrected as shown below:

Title Page, Column 2 (Other Publications), Line 2, change "Noteboook" to --Notebook--.

Signed and Sealed this

Third Day of June, 2008

JON W. DUDAS
*Director of the United States Patent and Trademark Office*